July 13, 1926.

E. B. L. HAGSTRÖM

LEVEL

Filed Sept. 17, 1924

1,592,734

INVENTOR.
E. B. L. Hagström
By William C. Linton.
Atty.

Patented July 13, 1926.

1,592,734

UNITED STATES PATENT OFFICE.

ERIK BERNHARD LAURENTIUS HAGSTRÖM, OF BORGVATTNET, SWEDEN.

LEVEL.

Application filed September 17, 1924, Serial No. 738,291, and in Sweden July 27, 1923.

The present invention relates to levels and has for its main object to provide a level which is easily and with great accuracy adjustable in any desired angle in relation to the frame of the level.

A further object of the invention is to provide means by which the level proper readily can be secured in any inclining position relatively to the frame of the level.

Another object of the invention is to provide means by which the inclining position of the level proper can be read off.

Other objects of the invention are made clear by the following description with reference to accompanying drawings illustrating two embodiments of the invention.

Figure 1:
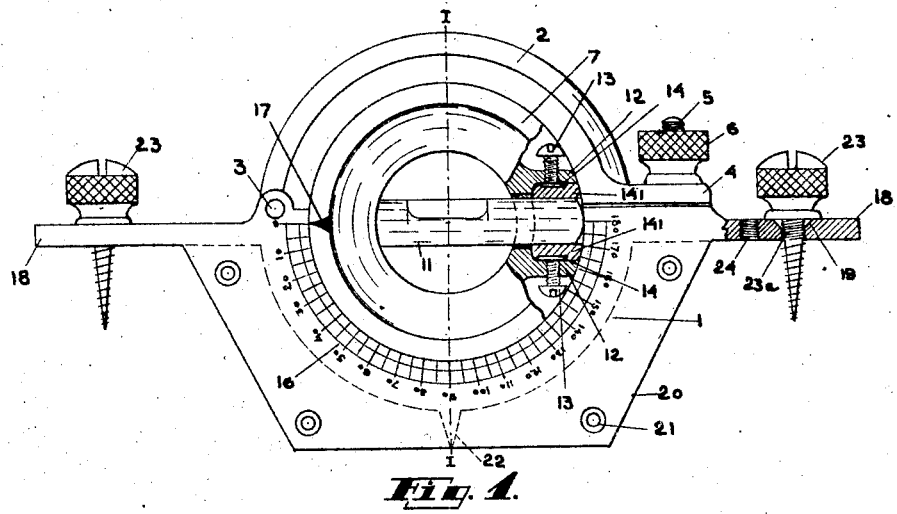
Figure 2:
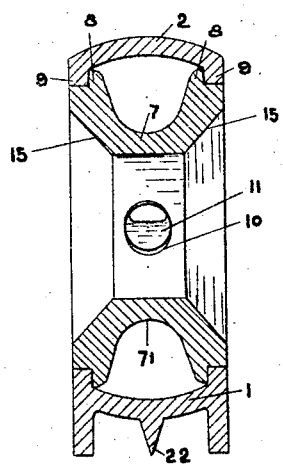

In the drawings Figure 1 is a side elevation of the level according to the one embodiment. Figure 2 is a section on the line 1—1 in Figure 1.

Referring now to the accompanying drawings wherein like and corresponding parts are designated by similar reference characters throughout the level comprises an annular casing divided diametrically in two parts 1 and 2. The lower part 1 forms the frame of the level and to this part the one end of the guard-shaped part 2 is hinged by means of a pin or pivot 3. The other end of the guard 2 is formed with a plate 4 having a hole or recess (not shown) for the reception of a screw 5 fixed to the frame 1. By means of a nut 6 co-operating with the screw 5 and the plate 4 the guard 2 may be secured in operative position as shown in the drawing. In the space between the parts 1 and 2 an externally circular and preferably annular member 7 is rotatably arranged and engages with the parts 1 and 2 by means of flanges 8 co-operating with flanges 9 on the said parts. By these flanges the lateral movement of the member 7 in the rotation thereof is prevented. By means of the guard 2 the member 7 may be fixed in the rotary position in which it has been adjusted. The member 7 is on diametrically opposite sides provided with oblong holes 10 (Figure 2) receiving the ends of the level proper 11. The member 7 is provided with a groove 71 formed round the said member and interrupted by portions 12 located on opposite sides of the level 11 and forming each the seat for a screw 13 by which the level 11 is held in position. The inner ends of the screws 13 carry plates 14 which are rotatably mounted on the screws and which may be plane or curved according to the shape of the level 11. These plates are designed to distribute the pressure of the screws 13 against the level 11 on a large surface. By means of the screws 13 the ends of the level 11 may be raised or lowered and said level thereby adjusted to the proper position in relation to the member 7. In order to protect the level 11 an elastic substance, for instance plates 141 of rubber or the like, may be applied between the plates 14 and the level 11.

The sides of the annular member 7 are recessed as shown at 15 and these sides also may be provided with grooves or the like in order to get a good hold of the member in the manipulation thereof.

On the sides of the frame 1 and, if desired, also on the guard 2 scales 16 are etched or engraved and co-operate with a mark 17 on the member 7.

The frame 1 is formed with horizontal supporting plates 18 provided with countersunk holes 19 for wood-screws or the like. Besides, the frame is provided with vertical supporting plates 20 with counter-sunk holes 21 and at the bottom of the frame with a pin 22 designed to prevent the lateral displacement of the device when the level is fastened occasionally to a surface plate or the like. In such a use of the level also the screws 23 may be employed. These screws are adapted to be screwed into wood without any need of special tools and are adjacent to their heads provided with metal-threads 23ª by means of which they can be screwed into correspondingly threaded holes 24 in the plates 18 when the level is not in use. Instead of these special screws, naturally, also ordinary wood-screws may be employed. Such screws also may be substituted by resilient guards or the like arranged in such a manner that the level may be fastened occasionally on the side of a surface plate whereby the semi-circular recess in the edge of said plate for the reception of the frame of the level is not required.

If the level be designed to be fixed permanently to a block or the like of the well-known kind the screws 23 and the pin 22 may be dispensed with. Likewise, the lateral supporting plates 20 may be dispensed with if the level be designed to be used occasionally only on a surface plate or the like. In order to enable the reading off of the level from above in horizontal leveling the part 2 and the member 7 may be provided with holes of suitable size and shape.

If the level 11 is to be replaced or adjusted so that the level shows horizontal position when the mark 17 indicates zero on the scale 16 and the supporting plates 18 rest upon surfaces disposed in the same horizontal plane the nut 6 is unscrewed and the member 7 removed from the frame 1 whereupon the screws 13 become accessible.

I do not limit my invention to the embodiments above described but want to vary the details thereof without interfering with the scope of the invention.

What I claim is:—

1. A level comprising a frame having a semi-circular recess formed therein an annular member adapted to be seated within the recess of said frame, bearing portions arranged diametrically opposite in a groove formed within the periphery of said annular member, a level tube seated within said bearing portions, locking means extending through said bearing portion for retaining said level tube in position, a semi-circular guard member, flanges formed with said annular member and cooperating with said frame and guard member for preventing lateral movement thereof, one end of said guard member being hingedly connected to said frame, a plate formed with the opposite or free end of said guard member being adjustably connected to said frame whereby rotary movement of said annular member may be limited and said annular member may be vertically removed from the recess of said frame when the guard member is in open position.

2. A level comprising a frame having a semi-circular recess formed therein, horizontal supporting plates formed with the upper end and extending from the opposite sides thereof, vertical supporting plates formed with the opposite faces of said frame, an annular member adapted to be seated within the recess of said frame, a level tube supported by said annular member, a semi-circular guard member, flanges formed with said annular member and cooperating with said frame and guard member for preventing lateral movement thereof, one end of said guard member being hingedly connected to said frame, and means for adjustably connecting the opposite end of said guard member to said frame whereby rotary movement of said annular member may be prevented and the latter removed from the frame when said guard member is in open position.

3. A level comprising a sectional frame, an annular member rotatably mounted within said frame, a level tube extending diametrically through said annular member and adjustably supported therein, a scale provided upon the lower section of said frame, a mark provided upon said annular member and adapted to cooperate with the zero mark of said scale, flanges formed with the sections of said frame and adapted to engage over said annular member to prevent lateral movement of the latter, the upper section of said frame having one end hingedly connected to one end of the lower section thereof, and means for adjustably connecting the opposite ends of the sections of said frame whereby said annular member may be retained against rotation.

In witness whereof I have hereunto set my hand.

ERIK BERNHARD LAURENTIUS HAGSTRÖM.